United States Patent
Ohgami et al.

(10) Patent No.: US 7,352,994 B2
(45) Date of Patent: Apr. 1, 2008

(54) METHOD, SYSTEM AND RECORDING MEDIUM USING A RELAY DEVICE FOR DETECTING AND INHIBITING COMMUNICATION

(75) Inventors: Yoichi Ohgami, Yamatotakada (JP); Kazuya Oyama, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 644 days.

(21) Appl. No.: 10/602,758

(22) Filed: Jun. 25, 2003

(65) Prior Publication Data

US 2004/0048567 A1 Mar. 11, 2004

(30) Foreign Application Priority Data

Jul. 16, 2002 (JP) .............................. 2002-207027

(51) Int. Cl.
H04B 7/14 (2006.01)
H04B 7/15 (2006.01)
H04M 1/00 (2006.01)

(52) U.S. Cl. .................. 455/7; 455/11.1; 455/552.1

(58) Field of Classification Search ................. 455/9, 455/11.1, 403, 7, 556.1, 557; 379/102.01, 379/103.03; 375/211
See application file for complete search history.

(56) References Cited

U.S. PATENT DOCUMENTS

| | | | |
|---|---|---|---|
| 3,745,462 A * | 7/1973 | Trimble | 455/11.1 |
| 3,955,140 A * | 5/1976 | Stephens et al. | 455/11.1 |
| 4,056,780 A * | 11/1977 | Faulkner | 455/9 |
| 5,919,250 A * | 7/1999 | Shimokawa | 709/252 |
| 6,151,490 A * | 11/2000 | Schultheiss | 455/403 |
| 6,795,685 B2 * | 9/2004 | Walkup | 455/11.1 |
| 7,080,544 B2 * | 7/2006 | Stepanik et al. | 73/31.02 |
| 7,116,894 B1 * | 10/2006 | Chatterton | 386/95 |
| 7,233,770 B2 * | 6/2007 | Williamson et al. | 455/7 |
| 2006/0199531 A1 * | 9/2006 | Williamson et al. | 455/11.1 |
| 2007/0153815 A1 * | 7/2007 | She et al. | 370/401 |

FOREIGN PATENT DOCUMENTS

| | | |
|---|---|---|
| JP | 62-107543 | 5/1987 |
| JP | 10-84343 | 3/1998 |
| JP | 2000-134220 | 5/2000 |
| JP | 2002-111890 | 4/2002 |
| JP | 2002-135260 A | 5/2002 |
| JP | 2002-135304 | 5/2002 |

* cited by examiner

Primary Examiner—Tilahun Gesesse
(74) Attorney, Agent, or Firm—Birch, Stewart, Kolasch & Birch, LLP

(57) ABSTRACT

A relay device includes a first signal reception unit receiving a signal from the outside, a first radio communication unit transmitting the signal by radio that is received by the first signal reception unit, a second radio communication unit provided separately from the first radio communication unit and transmitting/receiving a signal by radio, a detection unit detecting transmission/reception of the signal by the second radio communication unit, and a first inhibition unit inhibiting, during a period in which transmission/reception of the signal by the second radio communication unit is detected by the detection unit, transmission of the signal by the first radio communication unit. Thus, communication by means of a plurality of communication units can efficiently be accomplished.

11 Claims, 5 Drawing Sheets

METHOD, SYSTEM AND RECORDING MEDIUM USING A RELAY DEVICE FOR DETECTING AND INHIBITING COMMUNICATION

This nonprovisional application claims priority under 35 U.S.C. § 119 (a) on patent application Ser. No(s). 2002-207027 filed in JAPAN on Jul. 16, 2002, which is (are) herein incorporated by reference.

BACKGROUND OF THE INVENTION

1. Field of the Invention

The present invention relates to a relay device, a relay method, a relay program product and a computer-readable recording medium having a relay program recorded thereon. In particular, the present invention relates to a relay device, a relay method, a relay program product and a computer-readable recording medium having a relay program recorded thereon that are suitable for transmitting/receiving communication signals and video signals.

2. Description of the Background Art

There has been an AV (Audio Visual) wireless transmission system by which a video signal output from a videocassette recorder, DVD (Digital Versatile Disk) player or BS (Broadcasting Satellite)/CS (Communication Satellite) tuner is transmitted by radio to a remotely located monitor and output from the monitor in a home.

There has also been a wireless LAN (Local Area Network) system for use in computer-to-computer communication using radio as a transmission medium.

The computer-to-computer radio communication and the video radio transmission are used for different purposes. Therefore, the AV wireless transmission system and the wireless LAN are sometimes used concurrently.

However, if the AV wireless transmission system and the wireless LAN system are concurrently used and these systems use the same frequency, a packet signal transmitted from the AV wireless transmission system and a packet signal transmitted from the wireless LAN system collide with each other, resulting in a transmission error of these colliding signals. Accordingly, for the AV wireless transmission system, the video quality is deteriorated due to a packet loss. For the wireless LAN system, delay of transmission signals occurs due to an increased number of retransmissions.

SUMMARY OF THE INVENTION

It is an object of the present invention to provide a relay device, a relay method, a relay program product and a computer-readable recording medium having a relay program recorded thereon by which an efficient communication using a plurality of communication units can be achieved.

According to one aspect of the present invention, a relay device includes a first signal reception unit receiving a signal from the outside, a first radio communication unit transmitting the signal by radio that is received by the first signal reception unit, a second radio communication unit provided separately from the first radio communication unit and transmitting/receiving a signal by radio, a detection unit detecting transmission/reception of the signal by the second radio communication unit, and a first inhibition unit inhibiting, during a period in which transmission/reception of the signal by the second radio communication unit is detected by the detection unit, transmission of the signal by the first radio communication unit.

According to the present invention, during the period in which transmission/reception of the signal by the second radio communication unit is detected, transmission, by the first radio communication unit, of the signal received from the outside by the first signal reception unit is inhibited. Priority is thus given to the communication by the second radio communication unit and accordingly, the relay device capable of efficiently doing communication by using a plurality of communication units can be provided.

Preferably, the relay device further includes a second signal transmission/reception unit provided separately from the first signal reception unit and transmitting/receiving a signal to/from the outside, and the second radio communication unit transmits the signal in response to reception by the second signal transmission/reception unit.

According to the present invention, during the period in which transmission, by the second radio communication unit, of the signal received by the second signal transmission/reception unit is detected, transmission, by the first radio communication unit, of the signal received from the outside by the first signal reception unit is inhibited. Priority is thus given to the communication by the second radio communication unit and accordingly, communication by means of a plurality of communication units can efficiently be done.

Preferably, the relay device further includes a storage unit storing, during the period in which transmission of the signal by the first radio communication unit is inhibited by the inhibition unit, the signal received by the first signal reception unit.

According to the present invention, during the period in which transmission of the signal received from the outside by the first signal reception unit is inhibited, the signal received from the outside by the first signal reception unit is stored. Thus, loss of the signal received from the outside by the first signal reception unit can be prevented during the period in which the signal is transmitted/received by the second radio communication unit.

Preferably, the first radio communication unit transmits the signal stored by the storage unit when transmission/reception of the signal by the second radio communication unit is finished.

According to the present invention, when transmission/reception of the signal by the second radio communication unit is finished, the stored signal is transmitted by the first radio communication unit. Then, all of signals received by the first signal reception unit can surely be transmitted.

Preferably, the relay device further includes a second inhibition unit inhibiting, when the signal received by the first signal reception unit is a predetermined signal, transmission of the signal by the first radio communication unit.

According to the present invention, if a signal received from the outside by the first signal reception unit is a predetermined signal, transmission by the first radio communication unit, of the signal from the outside that is received by the first signal reception unit is inhibited. Information transmitted by the first radio communication unit can thus be restricted.

According to another aspect of the present invention, a relay method is a method of relaying a signal by a relay device including a first signal reception unit receiving a signal from the outside, a first radio communication unit transmitting the signal by radio that is received by the first signal reception unit and a second radio communication unit provided separately from the first radio communication unit and transmitting/receiving a signal by radio. The relay method includes the steps of receiving a signal by the first signal reception unit, transmitting the received signal by the first radio communication unit, detecting transmission/reception of a signal by the second radio communication unit, and inhibiting, during a period in which transmission/reception of the signal by the second radio communication unit is detected, transmission of the signal by the first radio communication unit.

According to the present invention, priority is given to the communication by the second radio communication unit and accordingly, the relay method can be provided by which communication by means of a plurality of communication units can efficiently be done.

According to still another aspect of the present invention, a relay program is a relay program executed by a relay device including a first signal reception unit receiving a signal from the outside, a first radio communication unit transmitting the signal by radio that is received by the first signal reception unit and a second radio communication unit provided separately from the first radio communication unit and transmitting/receiving a signal by radio. The relay device executes the relay program to perform the steps of receiving a signal by the first signal reception unit, transmitting the received signal by the first radio communication unit, detecting transmission/reception of a signal by the second radio communication unit, and inhibiting, during a period in which transmission/reception of the signal by the second radio communication unit is detected, transmission of the signal by the first radio communication unit.

According to the present invention, priority is given to the communication by the second radio communication unit and accordingly, the relay program product and a computer-readable recording medium having the relay program recorded thereon can be provided by which communication by means of a plurality of communication units can efficiently be done.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
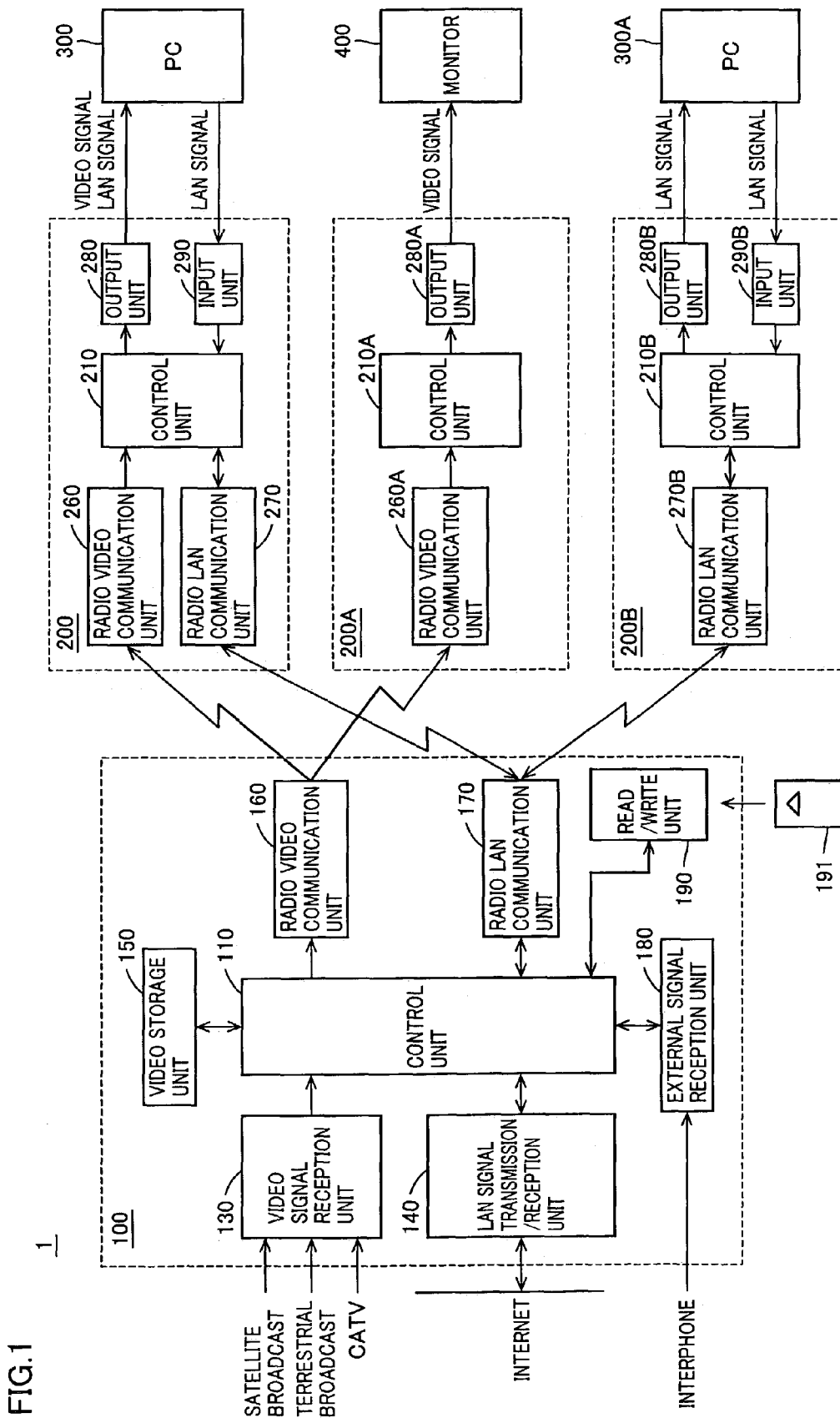
FIG. 1 shows a schematic configuration of a radio communication system according to an embodiment of the present invention.

An embodiment of the present invention is hereinafter described with reference to the drawings. It is noted that the same or corresponding components in the drawings are denoted by the same reference character and description thereof is not repeated here.

FIG. 1 shows a schematic configuration of a radio communication system 1 according to this embodiment. Referring to FIG. 1, radio communication system 1 includes a relay device 100 and terminal devices 200, 200A and 200B. Terminal device 200 is connected to a personal computer (hereinafter referred to as PC) 300 or incorporated in PC 300. Terminal device 200A is connected to a monitor 400 or incorporated in monitor 400. Terminal device 200B is connected to a PC 300A or incorporated in PC 300A.

Relay device 100 incorporates the function of a satellite broadcast receiver, terrestrial broadcast receiver, CATV (Community Antenna Television) receiver or DVD player, or connected to the satellite broadcast receiver, terrestrial broadcast receiver, CATV receiver or DVD player. Relay device 100 receives a video signal from such external video equipment as mentioned above and transmits the received video signal by radio. The transmitted video signal is received by terminal device 200 or terminal device 200A to be output to a display of PC 300 or to monitor 400.

Relay device 100 is connected to the Internet and communicates with terminal devices 200 and 200B by radio so as to make it possible to connect PC 300 and PC 300A to the Internet.

Further, relay device 100 is connected to an external interphone and communicates with terminal devices 200 and 200B by radio so as to make it possible to connect PC 300 and PC 300A to the interphone.

Relay device 100 thus has a function of relaying a video signal from the satellite broadcast receiver, terrestrial broadcast receiver, CATV receiver or DVD player to transmit the signal to PC 300 or monitor 400 connected to terminal devices 200 or 200A and a relay function of connecting PC 300 and PC 300B connected respectively to terminal devices 200 and 200B to the Internet.

Although radio communication system 1 in this embodiment includes, for example, one terminal device 200A and one terminal device 200B, the number of terminal devices is not limited to this. Any of terminal devices 200, 200A and 200B may be included in radio communication system 1, or an arbitrary combination of terminal devices 200, 200A and 200B may be included in radio communication system 1.

Relay device 100 and terminal devices 200, 200A and 200B are now described in detail.

Relay device 100 includes a control unit, 110 for controlling the whole of relay device 100, a video signal reception unit 130 for receiving a video signal from the outside, a LAN signal transmission/reception unit 140 for transmitting/receiving a LAN signal to/from the outside, a video storage unit 150 for storing a received video signal, a radio video communication unit 160 for transmitting a received video signal by radio, a radio LAN communication unit 170 for transmitting/receiving a LAN signal by radio, an external signal reception unit 180 for receiving an external signal from external equipment, and a read/write unit 190 reading/writing a program and data from/on a recording medium 191.

Control unit 110 includes a CPU (Central Processing Unit), a ROM (Read-Only Memory) and a RAM (Random-Access Memory). The CPU controls the whole of relay device 100, the ROM stores a program to be executed on the CPU, and the RAM is used as a working area necessary for executing the program.

Control unit 110 controls radio video communication unit 160 in such a manner that communication unit 160 transmits, by radio, a video signal received from video signal reception unit 130, and controls radio LAN communication unit 170 in such a manner that communication unit 170 transmits/receives, by radio, a LAN signal transmitted/received by LAN signal transmission/reception unit 140 as well as an external signal received by external signal reception unit 180. The LAN signal includes, for example, a mail signal for transmitting an electronic mail and receiving a mail from a server storing electronic mails, an HTML (HyperText Markup Language) document and an image associated with the document, a web signal for exchanging an audio file, an animation file and the like together with such information as their transcription, and a file transfer signal for transferring a file through the network.

Further, control unit 110 selects, based on a video selection signal received by radio LAN communication unit 170, a video signal to be received by video signal reception unit 130 and, based on a video control signal received by radio LAN communication unit 170, controls a video signal to be received by video signal reception unit 130. The video selection signal is a signal for selecting a video signal to be received by relay device 100, generated as a LAN signal according to user's selection of a desired video signal by video software executed on PC 300 to which terminal device 200 is connected, and transmitted by radio to relay device 100 via terminal device 200. The video control signal is a signal for controlling a video signal being transmitted from relay device 100 to terminal device 200, generated as a LAN signal according to user's input of a desired control signal for the video signal by video software executed on PC 300 to which terminal device 200 is connected, and transmitted by radio to relay device 100 via terminal device 200. Controlling of a video signal refers to reproduction and stop of a video signal being transmitted to terminal device 200. For example, under a condition that a video signal being transmitted to terminal device 200 is in a reproduced state, if a control signal for stopping the video signal is received, relay device 100 transmits the video signal in a stopped state to terminal device 200. Under a condition that a video signal being transmitted to terminal device 200 is in a stopped state, if a control signal for reproducing the video signal is received, relay device 100 transmits the video signal in a reproduced state to terminal device 200.

Control unit 110 further includes a detection unit detecting transmission/reception of a signal by radio LAN communication unit 170 and a video transmission inhibition unit inhibiting transmission of a video signal by radio video communication unit 160 during a period in which transmission/reception of a LAN signal by radio LAN communication unit 170 is detected by the detection unit. During the period in which transmission of the video signal is inhibited by the video transmission inhibition unit, control unit 110 controls video storage unit 150 in such a manner that storage unit 150 stores a video signal received by video signal reception unit 130. When transmission/reception of the signal by radio LAN communication unit 170 is finished, control unit 110 controls radio video communication unit 160 in such a manner that radio video communication unit 160 transmits the video signal stored by video storage unit 150.

Moreover, control unit 110 selectively includes a designated-video-transmission inhibition unit which inhibits transmission of a video signal by radio video communication unit 160 when a video signal received by video signal reception unit 130 is a predetermined video signal, for example, a video image which is designated as harmful.

Video signal reception unit 130 is an interface for receiving a video signal from external video equipment and thus receives an externally supplied video signal under control by control unit 110. Further, in order to efficiently process the video signal within relay device 100, video signal reception unit 130 converts the received video signal into a signal of a standardized video signal system, for example, an MPEG-2 (Moving Picture Experts Group phase 2) signal. The video signal system is not limited to MPEG-2 and may be another system according to which a video signal is digitized and converted into a packet signal.

LAN signal transmission/reception unit 140 is an interface for transmitting/receiving a LAN signal to/from the outside and transmits/receives, under control by control unit 110, a LAN signal to/from an external server for example via the Internet.

Video storage unit 150 is such a magnetic disk storage device as HDD (Hard Disk Drive). Instead of the magnetic disk storage device, a magneto-optical disk storage device, optical disk or the like may also be used. Video storage unit 150 stores a video signal received by video signal reception unit 130 under control by control unit 110. Further, video storage unit 150 outputs, under control by control unit 110, the stored video signal to radio video communication unit 160. Moreover, under control by control unit 110, video storage unit 150 stores the video signal received by video signal reception unit 130 while outputs the stored video signal to radio video communication unit 160.

Radio video communication unit 160 transmits by radio a video signal received by video signal reception unit 130 or a video signal stored by video storage unit 150, under control by control unit 110.

Radio LAN communication unit 170 transmits by radio a LAN signal received by LAN signal transmission/reception unit 140 or an external signal received by external signal reception unit 180, under control by control unit 110. Further, under control by control unit 110, radio LAN communication unit 170 receives a LAN signal by radio that is transmitted from terminal devices 200, 200B.

Radio video communication unit 160 and radio LAN communication unit 170 communicates with terminal devices by means of radio waves in the 2.4 GHz band according to a radio communication protocol defined by IEEE (Institute of Electrical and Electronic Engineers) 802.11b. The radio communication protocol of radio video communication unit 160 and radio LAN communication unit 170 is not limited to the radio communication protocol defined by IEEE 802.11b, and communication may be done based on another radio communication protocol.

External signal reception unit 180 receives an external signal from external equipment. The external equipment is, for example, an interphone. External signal reception unit 180 receives an external signal from the external equipment and transmits the received external signal as a LAN signal to control unit 110. The external equipment may alternatively be a gas-leak alarm or fire alarm.

Read/write unit 190 reads a program and data recorded on recording medium 191 and transmits them to control unit 110. Further, read/write unit 190 writes necessary data on recording medium 191 under an instruction from control unit 110.

Computer-readable recording medium 191 is a recording medium which holds a program, including a magnetic tape, a cassette tape, such a magnetic disk as floppy (R) disk and hard disk, such an optical disk as CD-ROM (Compact Disk Read-Only Memory) and DVD (Digital Versatile Disk), such a magneto-optical disk as MO (Magneto-Optical disk)

and MD (MiniDisk), such a memory card as IC card and optical card, and such a semiconductor memory as mask ROM, EPROM (Erasable Programmable Read-Only Memory), EEPROM (Electronically Erasable and Programmable Read-Only Memory) and flush ROM. Alternatively, the program may be downloaded from the satellite broadcast, terrestrial broadcast, CATV or the Internet.

Terminal device 200 includes a control unit 210 for controlling the whole of terminal device 200, a radio video communication unit 260 for receiving a video signal by radio from relay device 100, a radio LAN communication unit 270 for transmitting/receiving a LAN signal by radio to/from relay device 100, an output unit 280 for outputting the video signal received by radio video communication unit 260 and the LAN signal received by radio LAN communication unit 270 to PC 300, and an input unit 290 for inputting a LAN signal from PC 300.

Control unit 210 controls radio video communication unit 260 in such a manner that communication unit 260 receives a video signal from relay device 100 and controls output unit 280 in such a manner that output unit 280 outputs the received video signal to PC 300. Control unit 210 further controls radio LAN communication unit 270 in such a manner that communication unit 270 receives a LAN signal from relay device 100 and controls output unit 280 in such manner that output unit 280 outputs the received LAN signal to PC 300. Moreover, control unit 210 controls input unit 290 in such a manner that input unit 290 inputs such a LAN signal as video selection signal, video control signal, mail signal, web signal and file transfer signal from PC 300 and controls radio LAN communication unit 270 in such a manner that communication unit 270 transmits the input LAN signal to relay device 100.

Radio video communication unit 260 receives a video signal by radio that is transmitted from relay device 100, under control by control unit 210.

Radio LAN communication unit 270 receives a LAN signal by radio that is from relay device 100, and transmits a LAN signal input from input unit 290 by radio, under control by control unit 210.

Output unit 280 and input unit 290 are interfaces for connecting terminal device 200 to PC 300, for example, an interface conforming to PCMCIA (Personal Computer Memory Card International Association).

Output unit 280 outputs the video signal received by radio video communication unit 260 and the LAN signal received by radio LAN communication unit 270 to PC 300, under control by control unit 210.

Input unit 290 inputs the LAN signal from PC 300 under control by control unit 210.

Relay device 100 and terminal device 200 with the above-described configuration operate as follows.

(1) When a video selection signal for selecting a desired video signal is input from video software executed on PC 300 to terminal device 200, terminal device 200 transmits the video selection signal from PC 300 that is input by input unit 290 to terminal device 100 by radio LAN communication unit 270. Relay device 100 receives, by radio LAN communication unit 170, the video selection signal from terminal device 200, receives, by video signal reception unit 130, the video signal from external video equipment according to the video selection signal, and transmits, by radio video communication unit 160, the video signal to terminal device 200. Terminal device 200 receives, by radio video communication unit 260, the video signal from relay device 100 and, by output unit 280, outputs the video signal to PC 300.

(2) When a video control signal for controlling a video signal is input from video software executed on PC 300 to terminal device 200, terminal device 200 transmits the video control signal from PC 300 that is input by input unit 290 to terminal device 100 by radio LAN communication unit 270. Relay device 100 receives, by radio LAN communication unit 170, the video control signal from terminal device 200, controls, by control unit 110, a video signal being transmitted to the terminal device based on the video control signal, and transmits the video signal by radio video communication unit 160. Terminal device 200 receives, by radio video communication unit 260, the video signal from relay device 100 and outputs the video signal to PC 300 by output unit 280.

(3) When a mail signal is input from mail software executed on PC 300 to terminal device 200, when a web signal is input from a browser executed on PC 300 to terminal device 200, or when a file transfer signal is input from FTP (File Transfer Protocol) software executed on PC 300 to terminal device 200, terminal device 200 transmits, by radio LAN communication unit 270, a LAN signal like the mail signal, web signal or file transfer signal that is input by input unit 290 from PC 300, to relay device 100. Relay device 100 receives, by radio LAN communication unit 170, the LAN signal from terminal device 200, and transmits, by LAN signal transmission/reception unit 140, the LAN signal to the external server via the Internet.

(4) When a LAN signal is transmitted from the external server via the Internet, relay device 100 receives the LAN signal by LAN signal transmission/reception unit 140 and transmits the LAN signal by radio LAN communication unit 170. Terminal device 200 receives the LAN signal from relay device 100 by radio LAN communication unit 270 and outputs the LAN signal to PC 300 by output unit 280.

(5) When an external signal is transmitted from external equipment, relay device 100 receives the external signal by external signal reception unit 180 and transmits the external signal by radio LAN communication unit 170. Terminal device 200 receives the external signal from relay device 100 by radio LAN communication unit 270 and outputs the external signal to PC 300 by output unit 280.

Terminal device 200A includes a control unit 210A, a radio video communication unit 260A and an output unit 280A. Radio video communication unit 260A is similar to radio video communication unit 260 of terminal device 200 and thus description thereof is not repeated here.

Control unit 210A controls radio video communication unit 260A in such a manner that radio video communication unit 260A receives a video signal from relay device 100 and controls output unit 280A in such a manner that output unit 280A outputs the received video signal to monitor 400.

Output unit 280A is an interface for outputting a video signal to monitor 400 to which terminal device 200A is connected and, under control by control unit 210A, outputs the video signal received by radio video communication unit 260A to monitor 400.

Terminal device 200B includes a control unit 210B, a radio LAN communication unit 270B, an output unit 280B and an input unit 290B. Radio LAN communication unit 270B and input unit 290B are similar to radio LAN communication unit 270 and input unit 290 respectively of terminal device 200 and thus description thereof is not repeated here.

Control unit 210B controls radio LAN communication unit 270B in such a manner that radio LAN communication unit 270B receives a LAN signal from relay device 100 and controls output unit 280B in such a manner that output unit 280B outputs the received LAN signal to PC 300A. Further, control unit 210B controls input unit 290B in such a manner that input unit 290B inputs such a LAN signal as mail signal, web signal and file transfer signal from PC 300A and controls radio LAN communication unit 270B in such a manner that radio communication unit 270B transmits the input LAN signal to relay device 100.

Output unit 280B outputs, under control by control unit 210B, the LAN signal received by radio LAN communication unit 270B to PC 300A.

Figure 2:
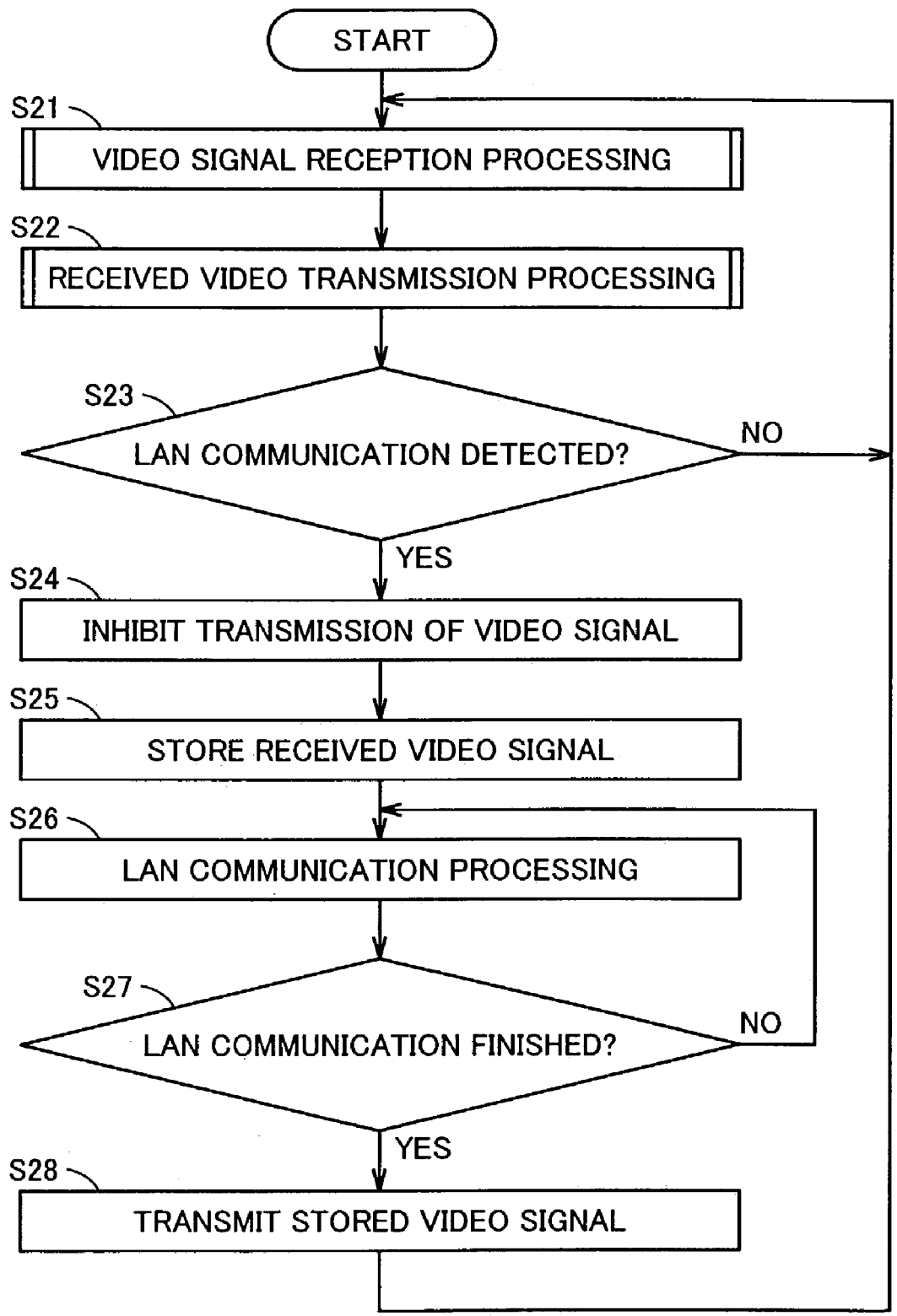
FIG. 2 is a flowchart showing signal communication processing carried out in a relay device in this embodiment.

FIG. 2 is a flowchart showing signal communication processing carried out in relay device 100 in this embodiment. Referring to FIG. 2, in relay device 100, radio signal reception unit 130 performs video signal reception processing to receive a video signal from external video equipment (step S21). The video signal reception processing is hereinlater described.

Radio video communication unit 160 performs received video transmission processing to transmit by radio the video signal received in step S21 (step S22). The received video transmission processing is hereinlater described.

Then, control unit 110 detects transmission/reception of a LAN signal by radio LAN communication unit 170 (step S23). If transmission/reception of a LAN signal is not detected, this process returns to step S21 and, if transmission/reception of a LAN signal is detected, the process proceeds to step S24.

Transmission/reception of a LAN signal is detected in the following cases.

(1) A video selection signal is received from terminal device 200, 200B.

(2) A video control signal is received from terminal device 200, 200B.

(3) A mail signal, web signal or file transfer signal is received from terminal device 200, 200B.

(4) A mail signal, web signal or file transfer signal received by LAN signal transmission/reception unit 140 is transmitted to terminal device 200, 200B.

(5) An external signal received by external signal reception unit 180 is transmitted to terminal device 200, 200B.

If transmission/reception of a LAN signal by radio LAN communication unit 170 is detected in step S23, control unit 110 inhibits transmission of a video signal by radio video communication unit 160 (step S24). During the period in which transmission of the video signal by radio video communication unit 160 is inhibited, radio storage unit 150 stores the video signal received by radio signal reception unit 130 (step S25).

Then, radio LAN communication unit 170 transmits/receives the LAN signal (step S26), and it is determined whether or not transmission/reception of the LAN signal is finished (step S27). If not finished, the transmission/reception of the LAN signal is continued and, if finished, the process proceeds to step S28.

Finally, the video signal which is stored in video storage unit 150 during the period in which the LAN signal is transmitted/received is transmitted by radio video communication unit 160 (step S28) and the process returns to step S21.

In the signal communication processing described in connection with FIG. 2, the video signal and the LAN signal are transmitted/received by any of terminal devices 200, 200A and 200B if they are located within the reach of the radio wave from relay device 100. However, the video signal and the LAN signal can be transmitted/received between predetermined relay device 100 and terminal device 200, 200A or 200B, by giving an identification number to the terminal device and storing the identification number in relay device 100 in advance, attaching an identification number of the relay device as well as the identification number of the terminal device to a video signal or a LAN signal to be transmitted/received and transmitting the video signal or LAN signal, so that the receiver of the video signal or LAN signal receives the signal to which predetermined identification numbers respectively of the transmitter and the receiver are attached.

Figure 3:
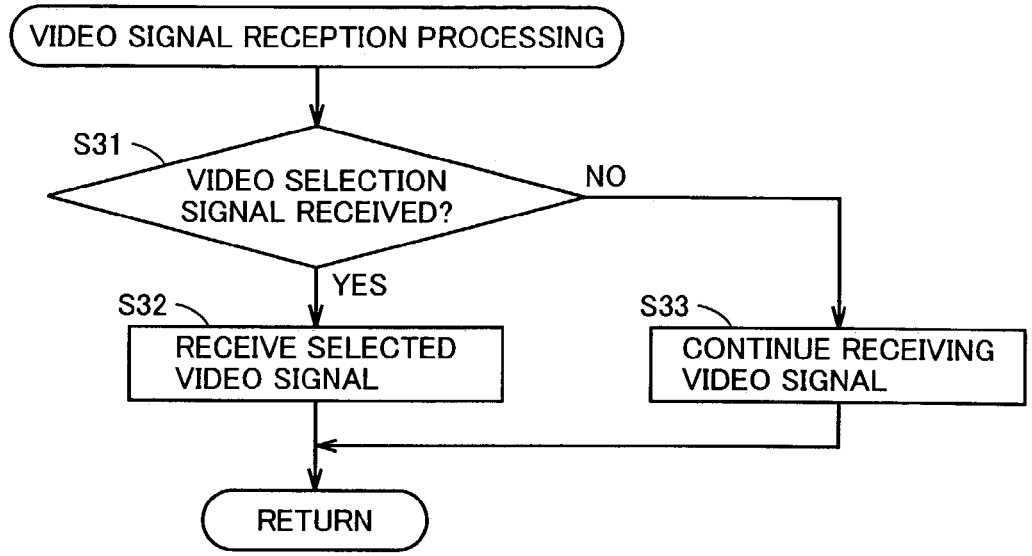
FIG. 3 is a flowchart showing video signal reception processing carried out in the relay device in this embodiment.

FIG. 3 is a flowchart showing the video signal reception processing carried out in relay device 100 in this embodiment. Referring to FIG. 3, in relay device 100, it is determined whether or not a video selection signal is received by radio LAN communication unit 170 (step S31). If the video selection signal is received, video signal reception unit 130 receives a video signal specified by the video selection signal (step S32) and the process returns to step S21 of the signal communication processing described in conjunction with FIG. 2. If the video selection signal is not received, video signal reception unit 130 continues receiving a video signal which the reception unit is receiving (step S33) and the process returns to step S21 of the signal communication processing described in conjunction with FIG. 2.

Figure 4:
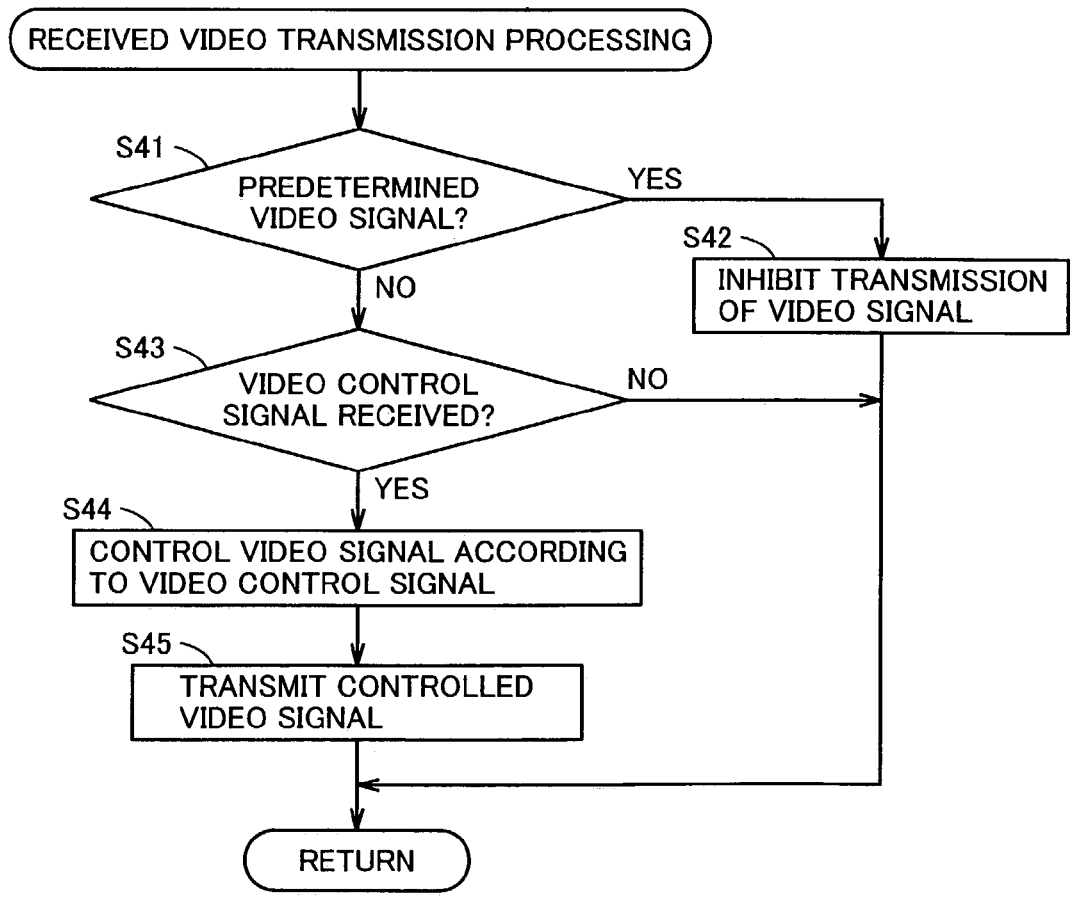
FIG. 4 is a flowchart showing received video transmission processing carried out in the relay device in this embodiment.

FIG. 4 is a flowchart showing the received video transmission processing carried out in relay device 100 in this embodiment. Referring to FIG. 4, in relay device 100, control unit 110 determines whether or not a video signal received by video signal reception unit 130 is a predetermined video signal (step S41). If it is the predetermined video signal, control unit 110 inhibits transmission by radio video communication unit 160 of the video signal received by video signal reception unit 130 (step S42), and the process returns to step S22 of the signal communication processing described in conjunction with FIG. 2.

In step S41, if it is determined that the received video signal is not the predetermined video signal, radio LAN communication unit 170 determines whether or not a video control signal is received (step S43). If the video control signal is received, control unit 110 controls the video signal received by video signal reception unit 130 according to the received video control signal (step S44), and the process proceeds to step S45. If the video control signal is not received, the process returns to step S22 of the signal communication processing described in conjunction with FIG. 2.

Then, radio video communication unit 160 transmits the video signal controlled in step S44 (step S45) and the process returns to step S22 of the signal communication processing described in conjunction with FIG. 2.

Figure 5:
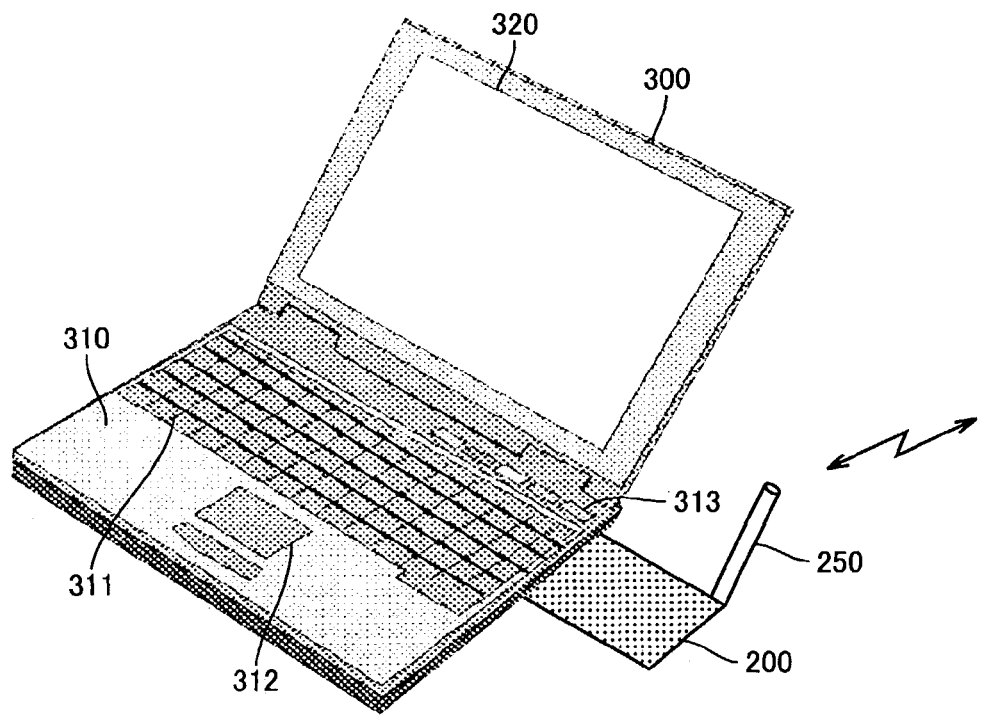
FIG. 5 is an external view of a terminal device in this embodiment.

FIG. 5 is an external view of terminal device 200 in this embodiment. Referring to FIG. 5, terminal device 200 includes an antenna 250 for doing radio communication of a signal with relay device 100 and is placed in a PCMCIA card slot of PC 300 of the notebook type. Here, although terminal device 200 is placed in the PCMCIA card slot, terminal device 200 may be incorporated in advance in PC 300 or connected to PC 300 via a LAN interface or the like of PC 300. Terminal device 200 transmits/receives a video signal and a LAN signal to/from relay device 100 via the antenna and transmits/receives a video signal and a LAN signal to/from PC 300 via a PCMCIA card bus.

PC 300 includes an input unit 310, an output unit 320 and a control unit. PC 300 further includes the PCMCIA card slot in which terminal device 200 is placed. Input unit 310 is composed of a keyboard 311, a pointing device 312 and a specific function button 313. Output unit 320 is formed of such a display as liquid-crystal display.

The control unit of PC 300 executes such application software as video software, mail software, browser and FTP according to instructions of a user that are entered from input unit 310. Under control of the control unit of PC 300, a signal output by the application software is displayed on output unit 320 and the signal output by the application software is output to terminal device 200 via the PCMCIA card bus. Moreover, under control of the control unit of PC 300, a video signal and a LAN signal input via the PCMCIA card bus from terminal device 200 is displayed on output unit 320 by the application software.

Figure 6:
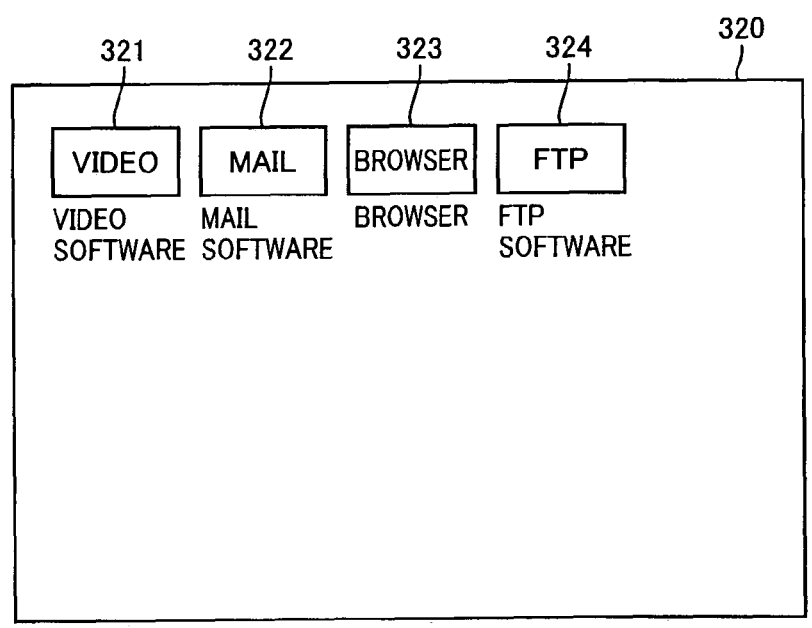
FIG. 6 shows an exemplary screen display of a PC connected to the terminal device in this embodiment.

FIG. 6 shows an exemplary screen display of PC 300 connected to terminal device 200 in this embodiment. Referring to FIG. 6, on the screen of output unit 320, an icon 321 for starting the video software, an icon 322 for starting the mail software, an icon 323 for starting the browser and an icon 324 for starting the FTP software are displayed. A user manipulates pointing device 312 to move a pointer displayed on the screen and select an icon in order to start a desired software.

Figure 7:
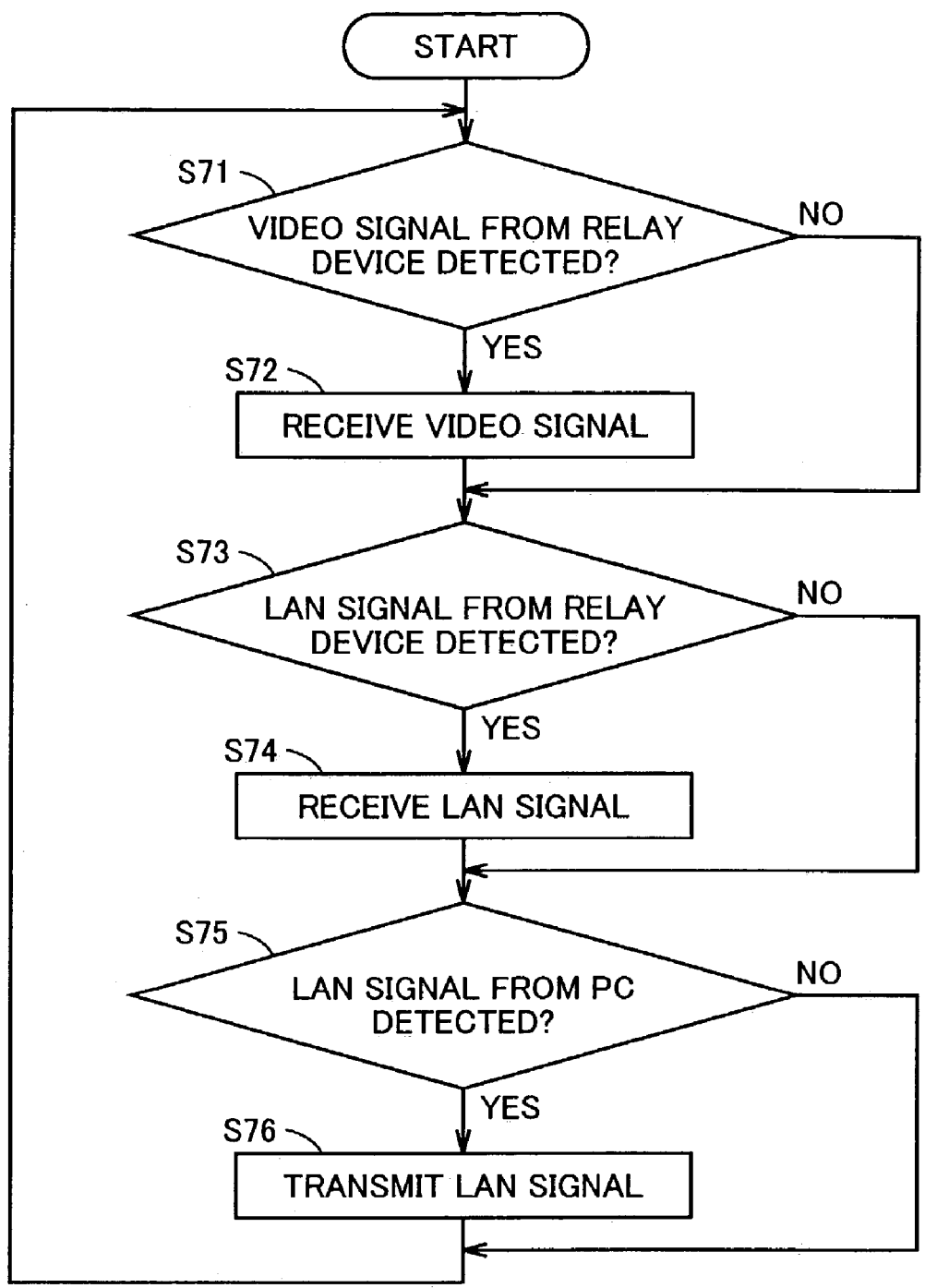
FIG. 7 is a flowchart showing signal communication processing carried out in the terminal device in this embodiment.

FIG. 7 is a flowchart showing signal communication processing carried out in terminal device 200 in this embodiment. Referring to FIG. 7, in terminal device 200, control unit 210 determines whether or not a video signal from relay device 100 is detected by radio video communication unit 260 (step S71). If the video signal is detected, radio video communication unit 260 receives the video signal from relay device 100 (step S72), and this process proceeds to step S73. If the video signal is not detected, this process proceeds to step S73.

Control unit 210 then determines whether or not a LAN signal transmitted from relay device 100 is detected by radio LAN communication unit 270 (step S73). If the LAN signal transmitted from relay device 100 is detected, the LAN signal from relay device 100 is received by radio LAN communication unit 270 (step S74) and this process proceeds to step S75. If the LAN signal transmitted from relay device 100 is not detected, the process proceeds to step S75.

A LAN signal transmitted from relay device 100 is detected in the following cases.

(1) A mail signal, web signal or file transfer signal is transmitted from relay device 100.

(2) An external signal is transmitted from relay device 100.

Control unit 210 then determines whether or not a LAN signal from PC 300 is detected at input unit 290 (step S75). If the LAN signal from PC 300 is detected, the LAN signal input from PC 300 is transmitted by radio LAN communication unit 270 to relay device 100 (step S76), and the process returns to step S71. If the LAN signal from PC 300 is not detected, the process returns to step S71.

Here, a LAN signal input from PC 300 is detected in the following cases.

(1) A video selection signal from the video software executed on PC 300 is input as a LAN signal.

(2) A video control signal from the video software executed on PC 300 is input as a LAN signal.

(3) A mail signal, web signal or file transfer signal is input as a LAN signal respectively from the mail software, browser or FTP software executed on PC 300.

As heretofore discussed, in relay device 100 of this embodiment, during a period in which transmission/reception of a LAN signal by radio LAN communication unit 170 is detected, transmission by radio video communication unit 160 of a video signal received from the outside by video signal reception unit. 130 is inhibited. Priority is thus given to the communication by radio LAN communication unit 170. Accordingly, relay device 100 capable of efficiently doing communication by using a plurality of communication units can be provided.

Further, in relay device 100 of this embodiment, during a period in which transmission by radio LAN communication unit 170 of a LAN signal received by LAN signal transmission/reception unit 140 is detected, transmission by radio video communication unit 160 of a video signal received from the outside by video signal reception unit 130 is inhibited. Priority is thus given to the communication by radio LAN communication unit 170 and accordingly, communication by means of a plurality of communication units can efficiently be done.

Still further, in relay device 100 of this embodiment, during the period in which transmission of a video signal received from the outside by video signal reception unit 130 is inhibited, the video signal received from the outside by video signal reception unit 130 is stored. Thus, loss of the video signal received from the outside by video signal reception unit 130 can be prevented during the period in which a LAN signal is transmitted/received by radio LAN communication unit 170.

Still further, in relay device 100 of this embodiment, when transmission/reception of a LAN signal by radio LAN communication unit 170 is finished, the stored video signal is transmitted by radio video communication unit 160. Thus, all of video signals received by video signal reception unit 130 can surely be transmitted.

Moreover, in relay device 100 of this embodiment, if a video signal received from the outside by video signal reception unit 130 is a predetermined video signal, transmission by radio video communication unit 160 of the video signal received from the outside by video signal reception unit 130 is inhibited. Information transmitted by radio video communication unit 160 can thus be restricted.

It is noted that, although processing carried out in relay device 100 has been described in connection with this embodiment, the present invention may be regarded as a relay method for executing the processing shown in FIG. 2 or a relay program for allowing a computer to execute the processing shown in FIG. 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A relay device comprising:
   a first signal reception unit receiving a first signal from the outside;
   a first radio communication unit further transmitting said first signal by radio;
   a second radio communication unit provided separately from said first radio communication unit either transmitting or receiving a second signal by radio;
   a detection unit detecting a transmission/reception of said second signal by said second radio communication unit; and
   a first inhibition unit inhibiting, during a period in which said transmission/reception of said second signal by said second radio communication unit is detected by said detection unit, transmission of said first signal by said first radio communication unit,
   wherein at least said first radio communication unit and said second radio communication unit are configured in a single assembly, and wherein said first signal and said second signal are different types of signals, including video signals and LAN signals.

2. The relay device according to claim 1, further comprising a second signal transmission/reception unit provided separately from said first signal reception unit either transmitting or receiving a signal to or from the outside, wherein
said second radio communication unit transmits said second signal in response to reception by said second signal transmission/reception unit of said second signal.

3. The relay device according to claim 1, further comprising a storage unit storing, during the period in which transmission of said first signal by said first radio communication unit is inhibited by said inhibition unit, said first signal received by said first signal reception unit.

4. The relay device according to claim 3, wherein
said first radio communication unit transmits said first signal stored by said storage unit when transmission/reception of said second signal by said second radio communication unit is finished.

5. The relay device according to claim 1, further comprising a second inhibition unit inhibiting, when a subsequent signal received by said first signal reception unit is a predetermined signal, transmission of said first signal by said first radio communication unit.

6. A method of relaying a signal by a relay device including a first signal reception unit, a first radio communication unit, and a second radio communication unit provided separately from said first radio communication unit capable of both transmitting/receiving signals by radio, comprising the steps of:
receiving a first signal from the outside by said first signal reception unit;
further transmitting said received first signal by said first radio communication unit;
detecting a transmission/reception of a second signal by said second radio communication unit; and
inhibiting, during a period in which said transmission/reception of said second signal by said second radio communication unit is detected, transmission of said first signal by said first radio communication unit,
wherein at least said first radio communication unit and said second radio communication unit are configured in a single assembly, and
wherein said first signal and said second signal are different types of signals, including video signals and LAN signals.

7. The method of relaying a signal by a relay device according to claim 6, further comprising:
providing a second signal transmission/reception unit separately from said first signal reception unit, said second signal transmission/reception unit receiving a signal to/from the outside,
wherein said second radio communication unit transmits said second signal in response to reception by said second signal transmission/reception unit of said second signal.

8. The method of relaying a signal by a relay device according to claim 6, further comprising the step of:
storing in a storage unit, during the period in which transmission of said first signal by said first radio communication unit is inhibited by said inhibition unit, said first signal received by said first signal reception unit.

9. The method of relaying a signal by a relay device according to claim 8, further comprising the step of:
transmitting by said first radio communication unit said first signal stored by said storage unit when transmission/reception of said second signal by said second radio communication unit is finished.

10. The method of relaying a signal by a relay device according to claim 6, further comprising the step of:
inhibiting by a second inhibition unit, when a subsequent signal received by said first signal reception unit is a predetermined signal, transmission of said first signal by said first radio communication unit.

11. A computer-readable recording medium having a relay program recorded thereon, said relay program being executed by a relay device including a first signal reception unit, a first radio communication unit, and a second radio communication unit provided separately from said first radio communication unit transmitting/receiving signals by radio, and said relay device executing said relay program to perform the steps of:
receiving a first signal from the outside by said first signal reception unit;
further transmitting said received first signal by said first radio communication unit;
detecting said transmission/reception of a second signal by said second radio communication unit; and
inhibiting, during a period in which said transmission/reception of said second signal by said second radio communication unit is detected, transmission of said first signal by said first radio communication unit,
wherein at least said first radio communication unit and said second radio communication unit are configured in a single assembly, and
said first signal received by said first signal reception unit and said signals transmitted/received by said second transmission/reception unit are different types of signals, including video signals and LAN signals.

* * * * *